US006720692B2

(12) United States Patent
Bell

(10) Patent No.: US 6,720,692 B2
(45) Date of Patent: Apr. 13, 2004

(54) ELECTRIC MOTOR HAVING ELECTROSTATIC SHIELD ARRANGEMENT

(75) Inventor: Sidney Bell, Athens, GA (US)

(73) Assignee: Reliance Electric Technologies, LLC, Mayfield Heights, OH (US)

(*) Notice: Subject to any disclaimer, the term of this patent is extended or adjusted under 35 U.S.C. 154(b) by 0 days.

(21) Appl. No.: 09/748,102

(22) Filed: Dec. 22, 2000

(65) Prior Publication Data

US 2001/0005106 A1 Jun. 28, 2001

Related U.S. Application Data

(63) Continuation of application No. 09/008,043, filed on Jan. 16, 1998, now Pat. No. 6,202,285.

(51) Int. Cl.[7] .......................... H02K 5/24; H02K 15/12
(52) U.S. Cl. ........................ 310/85; 310/86; 310/43; 310/215; 310/254
(58) Field of Search .................... 310/215, 85, 86, 310/43, 45, 72, 196, 254; 29/596

(56) References Cited

U.S. PATENT DOCUMENTS

| | | | | |
|---|---|---|---|---|
| 2,573,126 A | | 10/1951 | Andrus | 310/43 |
| 2,715,687 A | * | 8/1955 | Makous | 310/87 |
| 3,283,187 A | | 11/1966 | Schaefer | 310/86 |
| 3,633,056 A | | 1/1972 | Hoffmeyer | 310/180 |
| 3,633,057 A | | 1/1972 | Smith et al. | 310/184 |
| 4,160,170 A | | 7/1979 | Cope et al. | 310/215 |
| 4,246,505 A | | 1/1981 | Yasaka et al. | 310/218 |
| 4,308,476 A | | 12/1981 | Schuler | 310/45 |
| 4,780,635 A | | 10/1988 | Neumann | 310/216 |
| 4,949,001 A | | 8/1990 | Campbell | 310/220 |
| 5,175,396 A | | 12/1992 | Emery et al. | 310/36 |
| 5,341,561 A | | 8/1994 | Schorm et al. | 29/596 |
| 5,490,319 A | * | 2/1996 | Nakamura et al. | 29/596 |
| 5,661,353 A | | 8/1997 | Erdman et al. | 310/86 |
| 5,821,649 A | | 10/1998 | Langhorst | 310/68 R |
| 5,821,652 A | | 10/1998 | Hyypio | 310/83 |
| 5,979,087 A | | 11/1999 | Bell et al. | 310/254 |
| 6,011,338 A | | 1/2000 | Bell et al. | 310/184 |
| 6,202,285 B1 | * | 3/2001 | Bell | 29/596 |

FOREIGN PATENT DOCUMENTS

| | | | |
|---|---|---|---|
| GB | 963880 | 7/1964 | |
| JP | 61 185034 | 8/1986 | 310/88 |

OTHER PUBLICATIONS

Busse, Erdman, Kerkman, Schlegel, and Skidbinski; "An Evaluation of Electrostatic Shielded Induction Motor: A solution for Rotor Shaft Voltage Buildup and Bearing Current"; IEEE Conference, Oct. 1996.*

* cited by examiner

Primary Examiner—Karl Tamai
(74) Attorney, Agent, or Firm—Patrick S. Yoder; Alexander M. Gerasimow

(57) ABSTRACT

An electromechanical machine includes a stator fixed with respect to a housing structure and a rotor fixed with respect to a driven shaft. The stator includes a magnetically permeable core having a plurality of parallel winding slots containing conductive windings. Coilheads are located at opposite axial ends of the magnetically permeable core where the windings turn to extend down a parallel winding slot. The motor is equipped with an electrostatic shield arrangement to reduce capacitive coupling between the stator and rotor during operation. The shield arrangement comprises a grounded conductive layer separated from the conductive windings of the stator by an insulative layer of cured resin material. Preferably, the conductive layer may be formed of a conductive paint.

20 Claims, 5 Drawing Sheets

ELECTRIC MOTOR HAVING ELECTROSTATIC SHIELD ARRANGEMENT

CROSS REFERENCE TO RELATED APPLICATION

This is a continuation of application Ser. No. 09/008,043, filed Jan. 16, 1998, now U.S. Pat. No. 6,202,285.

BACKGROUND OF THE INVENTION

The present invention relates generally to the art of electric motors and other electromechanical machines. More particularly, the invention relates to an improved electrostatic shield arrangement for use in an electromechanical machine.

The shaft of an AC induction motor or other electromechanical machine is often supported by bearing assemblies maintained in position by the machine housing. In one known construction, each bearing assembly is supported by a portion of the housing known as the "end bell." As its name implies, the end bell is located at one axial end of the housing, and defines a hole through which the rotatable shaft freely extends.

During operation of an electric motor, capacitive coupling can often occur between the stator and rotor. Occasionally, the potential difference developed in this manner will exceed a magnitude necessary to break down insulating grease in the bearing assembly. In this case, currents may arc or discharge from the bearing balls or rollers to the outer bearing race causing "pits" or other undesirable effects. As a result, more frequent servicing of the bearing assemblies may be required.

The prior art has provided electrostatic shield arrangements to reduce capacitive coupling between the rotor and stator, and consequent current discharge through the bearing assemblies. Examples of various shield configurations can be seen in U.S. Pat. No. 5,661,353 to Erdman et al., incorporated herein by reference. While these arrangements have been effective at reducing capacitive coupling, a further need exists for various novel electrostatic shield arrangements that are compatible with mass production techniques.

SUMMARY OF THE INVENTION

The present invention recognizes and addresses the foregoing disadvantages, and others of prior art constructions and methods. Accordingly, it is an object of the present invention to provide an electromechanical machine having a novel electrostatic shield arrangement.

It is a more particular object of the present invention to provide an electromechanical machine having a novel electrostatic shield arrangement that is compatible with mass production techniques.

It is a further object of the present invention to provide a novel electrostatic shield arrangement that is compact and effective.

It is a further object of the present invention to provide a novel electrostatic shield arrangement in which a grounded conductive layer is separated from stator windings by an insulative layer.

It is also an object of the present invention to provide a novel method of manufacturing a stator for use in an electromechanical machine.

Some of these objects are achieved by an electromechanical machine comprising a housing structure rotatably supporting a shaft along a predetermined central axis. A stator having a plurality of conductive windings radially spaced about the central axis is fixed with respect to the housing structure. A rotor is also provided, located radially inward of the stator and fixed with respect to the shaft.

The electromechanical machine further comprises an electrostatic shield arrangement attached to the stator and adapted to interpose the conductive windings and the rotor. The shield arrangement comprises a conductive layer separated from the conductive windings by an insulative layer of resin material. Preferably, the insulative layer of the shield arrangement is located in respective winding slots defined in a magnetically permeable core of the stator. The conductive layer preferably comprises a nonmagnetic conductive material located radially inward of the insulative layer in the respective winding slots. The conductive layer may be in electrical communication with the magnetically permeable core, and grounded thereby. The stator also includes first and second coilheads located at opposite axial ends of the magnetically permeable core. In such embodiments, the shield arrangement is further located on an inner surface of the first and second coilheads. Preferably, the conductive layer of the shield arrangement is continuously conductive along an axial extent from the first coilhead across the slot windings to the second coilhead.

In exemplary embodiments, the insulative layer of the shield arrangement comprises a cured resin, such as a glass-filled resin, applied to the conductive windings to a predetermined thickness. Preferably, the resin substantially entirely impregnates the conductive windings of the stator. Furthermore, the conductive layer of the shield arrangement may comprise a metallic paint applied to a surface of the resin. A protective top coat may also be applied over the conductive layer on an inner surface of the stator.

Other objects of the present invention are achieved by an electromechanical machine comprising a fixed stator having conductive windings located in a plurality of parallel, axially extending winding slots defined about an inner surface of a magnetically permeable core. The stator further comprises first and second coilheads located at opposite axial ends of the magnetically permeable core. A movable rotor is located radially inward of the stator.

The electromechanical machine further includes an electrostatic shield arrangement attached to the stator. The shield arrangement includes a conductive layer separated from the windings by an insulating layer of resin material. The shield arrangement is located in the winding slots as well as on an inside surface of the first and second coilheads to interpose the conductive windings and the rotor.

The conductive layer of the shield arrangement preferably comprises a nonmagnetic conductive material located radially inward of the insulative layer. Preferably, the conductive layer is in electrical communication with the magnetically permeable core and is grounded thereby.

Other objects of the present invention are achieved by an electromechanical machine comprising a fixed stator having conductive windings located in a plurality of parallel, axially-extending winding slots defined in a magnetically permeable core. A movable rotor is operative to have a magnetic flux induced therein by excitation of the conductive windings of the stator. The conductive windings have a cured resin applied thereto to yield an insulative layer of predetermined thickness between the conductive windings and the rotor. A conductive layer of metallic paint is applied to the insulative layer and thereby separated from the conductive windings. The insulative layer and the conductive layer thus form an electrostatic shield arrangement interposing the conductive windings and the rotor.

Other objects of the present invention are achieved by a method of manufacturing a stator for use in an electromechanical machine. One step of the method involves providing a magnetically permeable core having conductive windings located in a plurality of parallel, axially-extending winding slots. An uncured resin material is applied to the conductive windings in a sufficient amount to yield an insulative layer of predetermined thickness. Next, the resin material is at least partially cured. A metallic material is then applied over the insulative layer to form a conductive layer in electrical communication with the magnetically permeable core.

According to exemplary methodology, the resin material is only partially cured prior to the metallic material being applied to the insulative layer. In such cases, the resin material is finish cured after the metallic material has been applied to the insulative layer.

Often, it will be desirable to apply and partially cure the resin material more than once before the metallic material is applied to the insulative layer in order to achieve the predetermined thickness thereof.

Other objects, features and aspects of the present invention are achieved by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
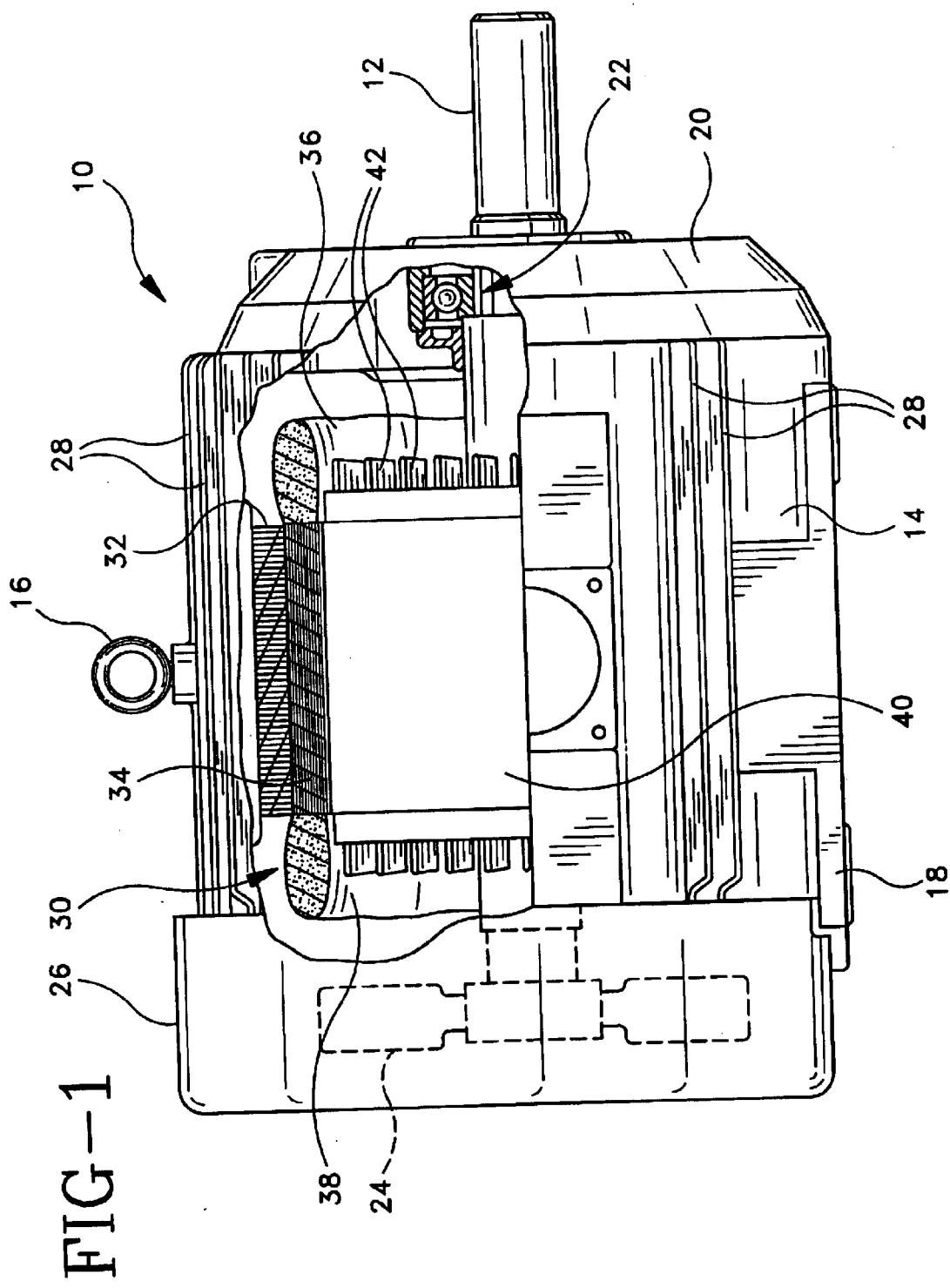
FIG. 1 is an elevational view of an electric motor showing the motor housing partially cut away to reveal various internal components therein.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 2:
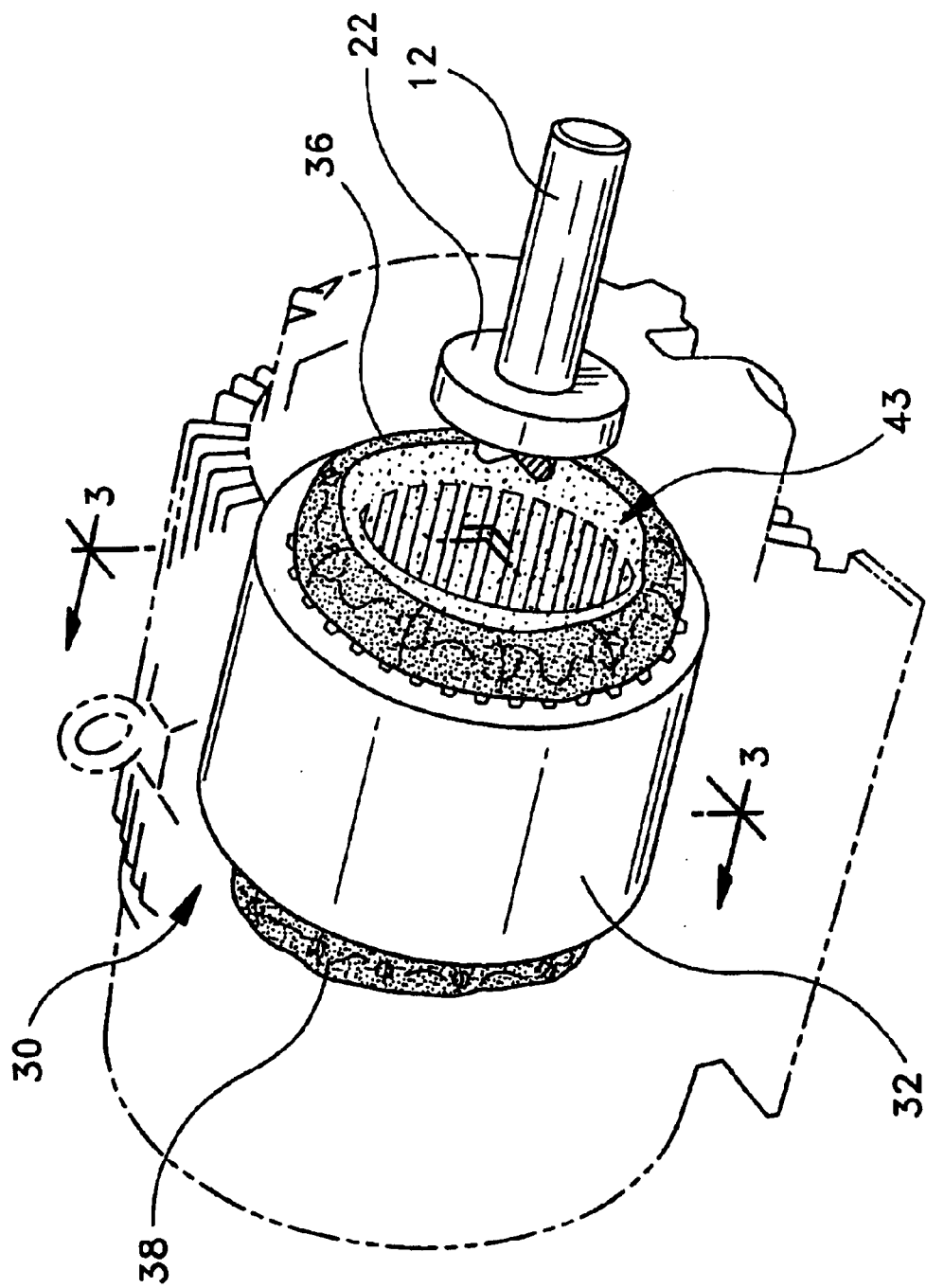
FIG. 2 is a perspective view of the stator and a portion of the motor shaft, with the motor housing being shown in phantom.

Referring now to FIGS. 1 and 2, an electric motor 10 constructed in accordance with the present invention has a rotatable shaft 12 extending along a central axis. The internal components of motor 10 are enclosed by a housing including a main housing portion 14. One or more eyebolts 16 may be provided to facilitate lifting of motor 10. Main housing portion 14 defines an appropriate base 18 on which motor 10 will rest during use.

The housing of motor 10 further includes end portions, such as end bell 20, located at respective axial sides of main housing portion 14. The end portions may be attached to main housing portion 14 by any appropriate means, such as by bolts. Typically, each end portion will maintain a respective bearing assembly, such as bearing assembly 22, to facilitate rotation of shaft 12.

Shaft 12 continues through bearing assembly 22 and beyond end bell 20 for connection to other equipment. The opposite end of shaft 12 carries a fan 24, located within shroud 26. Due to the configuration of shroud 26, rotation of fan 24 causes cooling air to circulate around various cooling fins 28 defined on the exterior of main housing portion 14.

Inside of its housing, motor 10 includes a stator 30 that remains fixed during operation. Stator 30 includes a magnetically permeable core 32 preferably comprising a plurality of relatively thin laminations arranged in a stack. As indicated at 34, longitudinal windings are located in parallel, axially-extending slots defined about the inside surface of core 32 to provide a flow path for flux-generating current. The windings turn at respective coilheads 36 and 38 to return along a parallel slot.

A rotor 40, secured to shaft 12, desirably rotates based on the electromagnetic interaction between it and stator 30. In the illustrated embodiment, motor 10 is an induction motor, wherein rotor 40 is constructed as a "squirrel cage" in a known manner. A plurality of radial vanes, such as vanes 42, may be provided at the periphery of the rotor ends to circulate cooling air inside the motor housing.

During operation, capacitive coupling between the stator and rotor of an electric motor may produce errant currents through the bearing assemblies utilized to support the rotatable shaft. As described above, arcing in the bearing assembly can pit the race on which the ball or roller bearings ride, leading to increased maintenance requirements. To reduce capacitive coupling, the present invention provides an electrostatic shield arrangement, indicated generally at 43, interposed between rotor 40 and the conductive windings of stator 30.

The electrostatic shield arrangement provides a conductive path to ground for charge that could otherwise collect on rotor 40. In addition, the electrostatic shield arrangement is constructed so that the conductive path will be well-insulated from the conductive windings of stator 30. This is particularly advantageous in inverter-driven motor applications due to the high switching voltages that can be developed.

Figure 3:
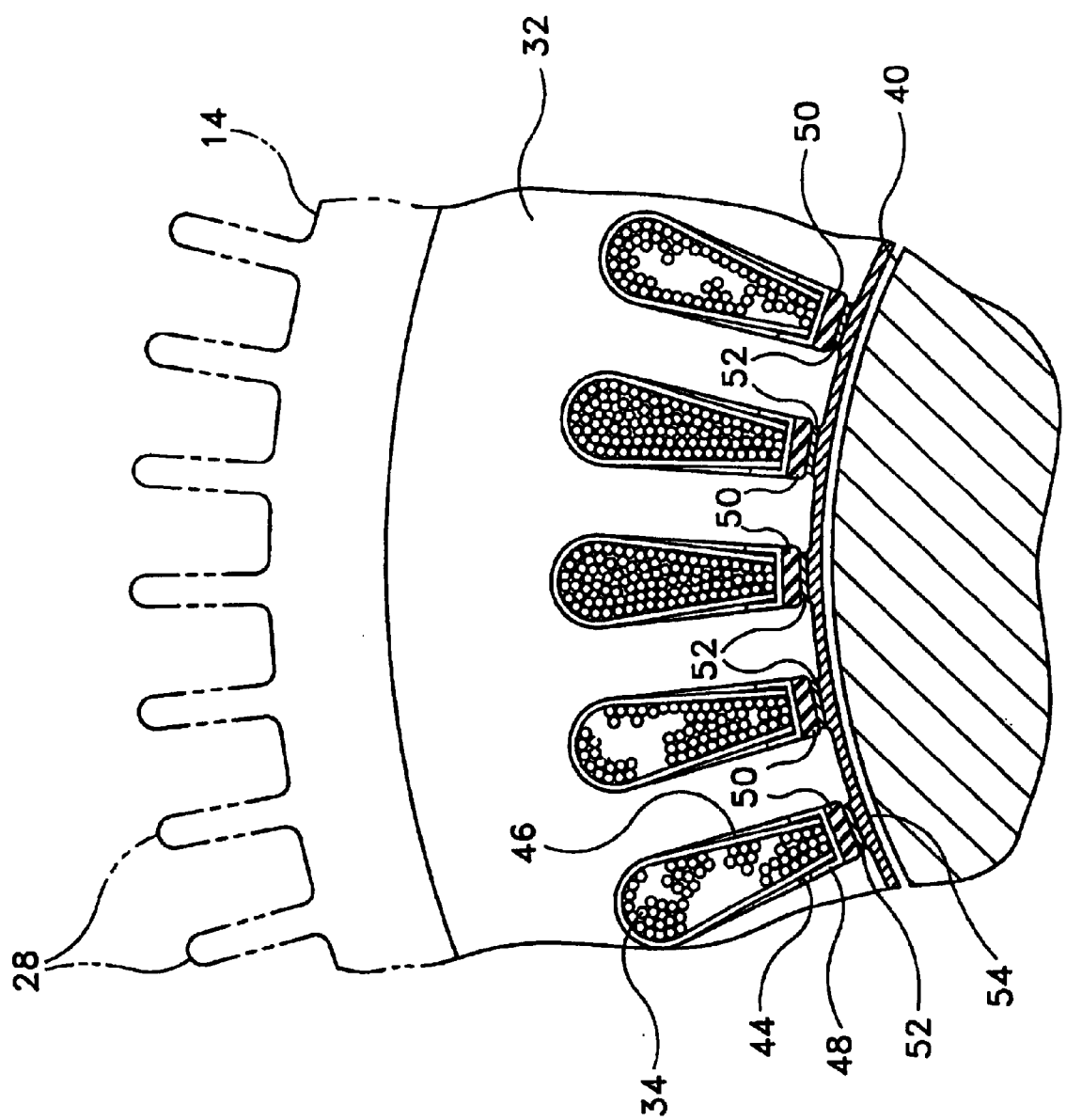
FIG. 3 is an enlarged partial cross-sectional view as taken along line 3—3 of FIG. 2.
Figure 4:
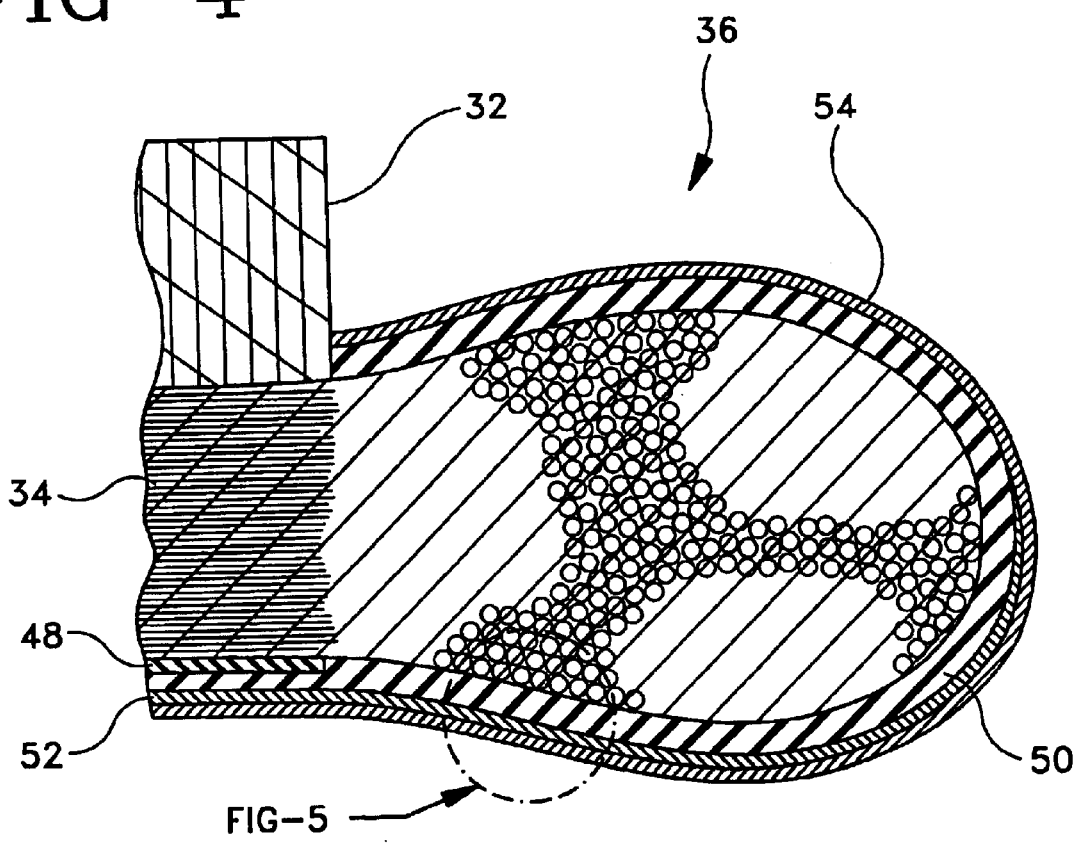
FIG. 4 is an enlarged partial cross-sectional view of a stator coilhead showing the electrostatic shield arrangement located thereon.

Referring now to FIGS. 3 and 4, the electrostatic shield arrangement as utilized in the illustrated embodiment can be most easily explained. In particular, FIG. 3 shows the location of the shield arrangement in the area of stator 30 axially between coilheads 36 and 38. The construction of the shield arrangement on the coilheads may be understood with reference to FIG. 4, where only coilhead 36 is shown for purposes of explanation.

As can be seen in FIG. 3, conductive windings 34 each comprise a plurality of individual conductors situated in parallel, axially-extending winding slots, such as slot 44. Although the conductors are individually insulated, an insulative slot liner 46 is preferably located in each slot to further prevent the possibility of grounding to core 32. An insulative top liner 48, known as a "top stick," may be located at the "top" of each slot as shown.

Looking now also at FIG. 4, the electrostatic shield arrangement includes an insulative layer 50 located on the inside surface of coilheads 36 and 38, as well as along the entire axial extent of each slot 44. As shown, a conductive layer 52 is applied to insulative layer 50 radially inward thereof (i.e., toward shaft 12). Preferably, conductive layer 52 will be in electrical communication with core 32, such as by contact with the inside walls of slots 44. As a result, conductive layer 52 will be desirably grounded. Because core 32 is already grounded, there is generally no need to provide a conductive layer on the inner surface of core 32 between adjacent winding slots. A nonconductive top coat 54, such as a known protective paint, may be applied over conductive layer 52, as well as other exposed surfaces of stator 30, to provide protection against corrosion and the like.

Figure 5:
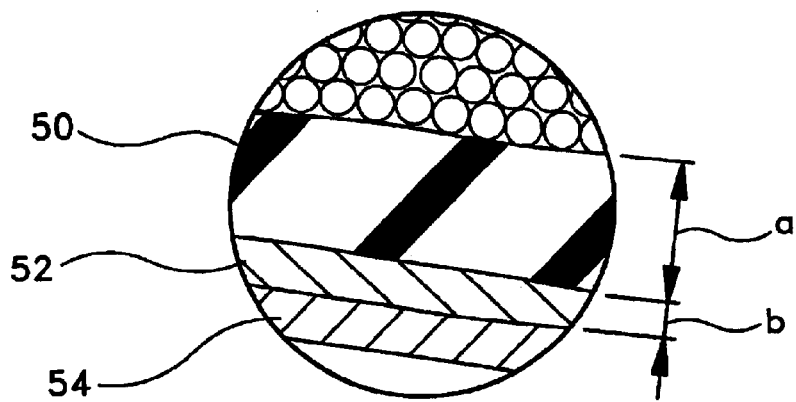
FIG. 5 is a further enlarged view of the area so indicated in FIG. 4.

The various layers of the electrostatic shield arrangement can be easily seen in FIG. 5. The thickness of insulative layer 50 is selected, depending on the material, to provide the desired resistance. The desired resistance in presently preferred embodiments may be generally at least 10 megohms, which will comply with applicable industry standards.

Insulative layer 50 may be formed of a cured resin material impregnated into the stator windings. For example, various resinous materials, such as varnishes, epoxys, polyesters or suitable copolymers, may be suitable for this purpose. Although many embodiments will utilize a thermoset resin, it is believed that resins that are cured by catalytic action may also be employed in at least certain applications.

The resin is generally applied in amounts thicker than would otherwise be the case in order to yield the desired layer thickness. For example, a glass-filled thixotropic epoxy resin may be used due to its tendency to apply in relatively thick coats. Such a resin is available, for example, from P.D. George Co. of St. Louis, Mo. In this case, the thickness "a" will preferably be greater than approximately 0.012 inches.

As will be appreciated, conductive layer 52 is preferably formed of a nonmagnetic material to prevent adverse effects on the magnetic properties of the machine. Conductive layer 52 may be applied to insulative layer 50 by spraying or brushing, such as by application of a conductive paint. Paints suitable for this purpose which are copper filled and conductive when dried in a film are available from Spraylat Corporation of Chicago, Ill. In a known application, such paints have been used in the past to treat fan screens to reduce static buildup. Generally, the thickness "b" of conductive layer 52 will be greater than approximately 0.001 inches.

As a particular advantage, the electrostatic shield arrangement described above is readily compatible with mass production techniques. For example, in the production of many mass-produced motors, the stator is already dipped in varnish to "set" and protect the stator windings. The present invention contemplates that the resin material used for this purpose is selected and applied to achieve the desired properties.

Figure 6:
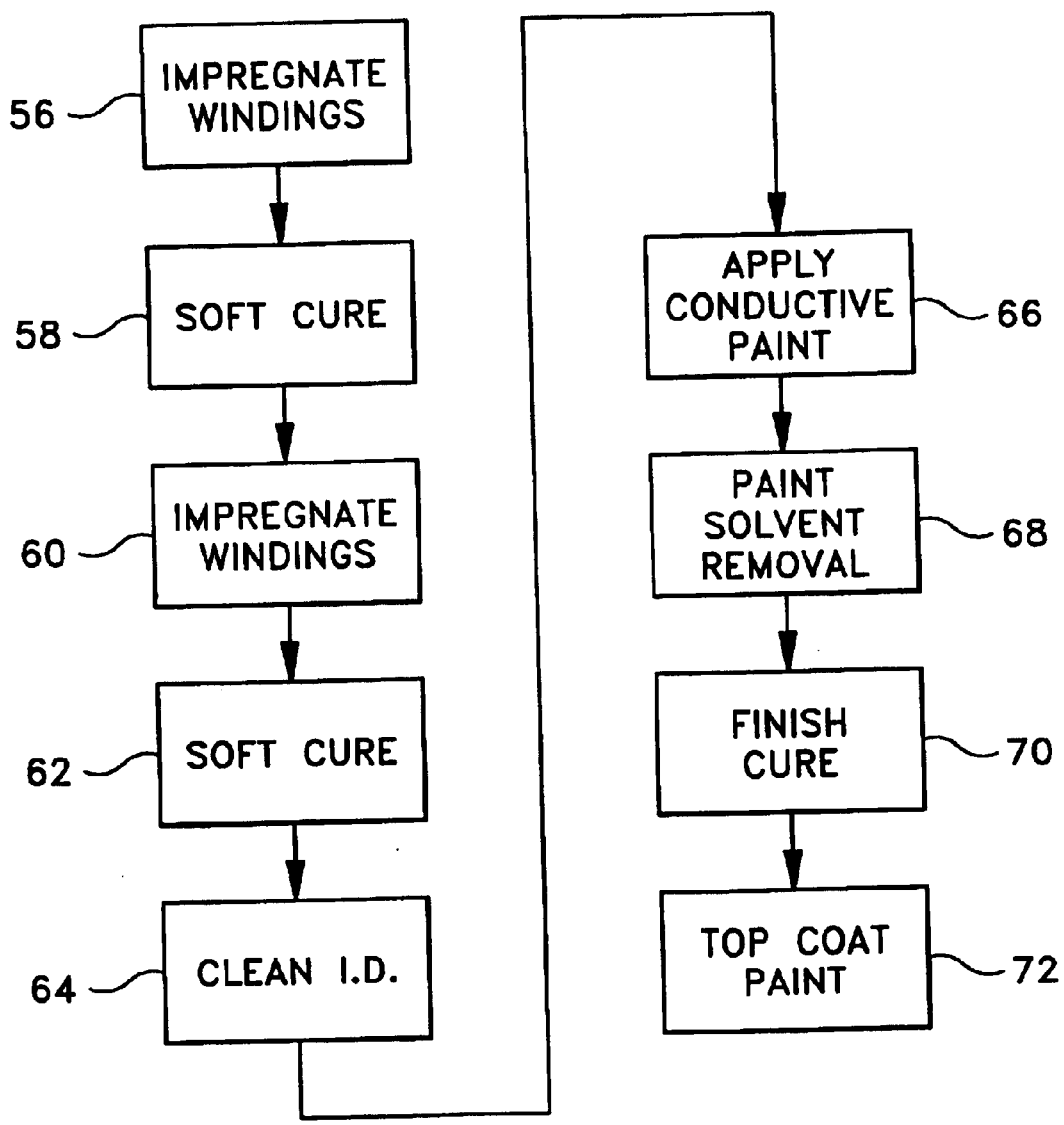
FIG. 6 is a flow diagram showing steps of producing a stator for use in an electromechanical machine according to the present invention.

Toward this end, FIG. 6 illustrates exemplary processing steps in which a stator core is first supplied having conductive windings situated thereon. As indicated at 56, the core is subjected to an impregnation procedure to impregnate the conductive windings with the selected resin. With a thick resin, a vacuum impregnation (VPI) procedure is especially preferred to fully impregnate the conductive windings. In addition to providing an insulative layer on the surface of the winding group as noted above, an impregnated resin will displace air between adjacent wires which could otherwise produce undesirable corona discharge.

The resin is then partially ("soft") cured, as indicated at 58, such that the resin is less than completely set. For example, a thermoset resin may be removed from the curing oven prematurely. As indicated at 60, the stator core may then be subjected to one or more additional resin impregnations if a desired thickness for the insulative layer was not achieved in the initial impregnation. Each subsequent impregnation is then soft cured, as indicated at 62.

After the final impregnation, the inner diameter of the stator core iron may be cleaned as indicated at 64. This step ensures that substantially all resin is removed from the inner surface of the stator iron between the winding slots. Resin will remain in the slots, radially inward of the windings, to provide the desired insulative layer.

As indicated at 66, conductive paint may then be applied to the partially cured resin. Next, as indicated at 68, the paint solvent is allowed to evaporate, or is otherwise removed. The resin is then finish cured, as indicated at 70, until it is fully set. Application of the paint before the resin is fully cured is believed to achieve a more integral bonding of the conductive and insulative layers. Finally, the protective top coat is applied, as indicated at 72.

It can thus be seen that the present invention provides electromechanical machines having novel electrostatic shield arrangements. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An electromechanical machine comprising:
    a stator having an inner surface and having conductive windings located in a plurality of parallel, axially extending winding slots defined in a magnetically permeable core;
    a rotor disposed axially within said stator;
    an electrostatic shield comprising a conductive layer disposed on an inner surface of said stator at least opposite said rotor and electrically insulated from said conductive windings of the stator; and
    an insulative layer disposed over substantially the entire inner surface of the stator and said electrostatic shield between said conductive windings of said stator and said rotor.

2. An electromechanical machine as set forth in claim 1, further comprising an insulative layer having a conformal structure characteristic of a resin that had been applied to said stator in an uncured state after said conductive windings were placed in said winding slots and subsequently cured to yield a predetermined layer thickness between said conductive windings and said rotor.

3. An electromechanical machine as set forth in claim 2, wherein said cured resin is a glass-filled thermoset resin.

4. An electromechanical machine as set forth in claim 2, wherein said predetermined thickness of said insulative layer is at least approximately 0.012 inches.

5. An electromechanical machine as set forth in claim 1, wherein said conductive layer comprises a conductive paint bonded to said stator.

6. An electromechanical machine as set forth in claim 1, wherein said conductive layer is in electrical communication with a magnetically permeable core and is grounded thereby.

7. An electromechanical machine as set forth in claim 2, wherein said cured resin substantially entirely impregnates said conductive windings of said stator.

8. An electromechanical machine comprising:

a fixed stator having conductive windings located in a plurality of parallel, axially-extending winding slots defined about an inner surface of a magnetically permeable core, said stator further comprising first and second coilheads located at opposite axial ends of said magnetically permeable core;

each of said winding slots including an insulative top liner located radially inward of said conductive windings located therein;

a movable rotor located radially inward of said stator;

an electrostatic shield arrangement being formed by an insulative layer of resin material covered by a conductive layer located radially inward thereof;

said insulative layer and said conductive layer being conformally applied to said stator so as to be located in said winding slots radially inward of said respective top liner and an inside surface of said first and second coilheads to interpose said conductive windings and said rotor; and an insulating, protective top coat applied over said conductive layer on an inner surface of said stator.

9. An electromechanical machine as set forth in claim 8, wherein said conductive layer of said shield arrangement comprises a nonmagnetic conductive material located radially inward of said insulative layer.

10. An electromechanical machine as set forth in claim 9, wherein said conductive layer is in electrical communication with said magnetically permeable core and is grounded thereby.

11. An electromechanical machine as set forth in claim 10, wherein said conductive layer of said shield arrangement comprises a metallic paint applied to a surface of said insulative layer.

12. An electromechanical machine as set forth in claim 11, wherein said metallic paint comprises a copper paint.

13. An electromechanical machine as set forth in claim 8, wherein said insulative layer of said shield arrangement comprises a glass-filled thermoset resin applied to said conductive windings to a predetermined thickness.

14. An electromechanical machine as set forth in claim 13, wherein said thermoset resin substantially entirely impregnates said conductive windings of said stator.

15. An electromechanical machine comprising:

a fixed stator having conductive windings located in a plurality of parallel, axially extending winding slots defined in a magnetically permeable core;

a movable rotor operative to have a magnetic flux induced therein by excitation of said conductive windings of said stator;

an insulative layer having a conformal structure characteristic of a resin that had been applied to said stator in an uncured state after said conductive windings were placed in said winding slots and subsequently cured to yield a predetermined layer thickness between said conductive windings and said rotor; and a conductive layer of metallic paint bonded to said insulative layer and thereby separated from said conductive windings, said insulative layer and said conductive layer thereby forming an electrostatic shield arrangement interposing said conductive windings and said rotor; and an insulating, protective top coat applied over said conductive layer on an inner surface of said stator.

16. An electromechanical machine as set forth in claim 15, wherein said conductive layer is in electrical communication with said magnetically permeable core and is grounded thereby.

17. An electromechanical machine as set forth in claim 15, wherein said metallic paint comprises a copper paint.

18. An electromechanical machine as set forth in claim 15, wherein said cured resin substantially entirely impregnates said conductive windings of said stator.

19. An electromechanical machine as set forth in claim 15, wherein said cured resin is a glass-filled thermoset resin.

20. An electromechanical machine as set forth in claim 19, wherein said predetermined thickness of said insulative layer is at least approximately 0.012 inches.

* * * * *